United States Patent
Dougherty

(10) Patent No.: US 6,616,347 B1
(45) Date of Patent: Sep. 9, 2003

(54) CAMERA WITH ROTATING OPTICAL DISPLACEMENT UNIT

(76) Inventor: Robert Dougherty, 10914 NE. 18 St., Bellevue, WA (US) 98004

( * ) Notice: Subject to any disclaimer, the term of this patent is extended or adjusted under 35 U.S.C. 154(b) by 0 days.

(21) Appl. No.: 09/677,223

(22) Filed: Sep. 29, 2000

(51) Int. Cl.[7] .................................................. G03B 3/00
(52) U.S. Cl. .......................... 396/351; 396/89; 396/544
(58) Field of Search ........................... 396/89, 107, 111, 396/351, 342, 71, 432, 544; 356/3.15, 3.13

(56) References Cited

U.S. PATENT DOCUMENTS

| | | | |
|---|---|---|---|
| 3,833,291 A | * 9/1974 | Samuelson | 396/544 |
| 3,846,810 A | * 11/1974 | Ihms | 396/544 |
| 4,235,541 A | * 11/1980 | Jamel | 396/432 |
| 4,249,791 A | 2/1981 | Helm et al. | 350/16 |
| 4,437,745 A | 3/1984 | Hajnal | 354/117 |
| 4,580,886 A | 4/1986 | Hajnal | 354/79 |
| 4,589,770 A | * 5/1986 | Jones et al. | 356/1 |
| 4,868,588 A | 9/1989 | Hajnal | 354/79 |
| 5,189,545 A | 2/1993 | Takata et al. | 359/197 |
| 5,430,575 A | 7/1995 | Sudarshan et al. | 359/434 |
| 5,469,236 A | 11/1995 | Roessel | 354/79 |
| 5,642,299 A | * 6/1997 | Hardin et al. | 364/561 |
| 5,657,402 A | 8/1997 | Bender et al. | 382/284 |
| 5,710,875 A | 1/1998 | Harashima et al. | 345/419 |
| 5,727,236 A | 3/1998 | Frazier | 396/71 |
| 6,229,549 B1 | * 5/2001 | Smith | 345/430 |

OTHER PUBLICATIONS

Frank Beacham, Moving the Camera, Sep. 8, 2000, 5 pgs. http://www.hi8theater.com/articles/moving.html.

* cited by examiner

Primary Examiner—Christopher Mahoney
(74) Attorney, Agent, or Firm—Gary C. Cohn PLLC

(57) ABSTRACT

Ranges of objects are determined using a camera equipped with a rotating optical axis displacement unit (ODU). The ODU receives light about an offset line of sight, and displaces it to a substantially parallel camera line of sight. The displaced light is focussed onto an image sensor. Images of a scene are captures as the ODU rotates. Range information is calculated from the apparent motion of objects in the captured images.

15 Claims, 5 Drawing Sheets

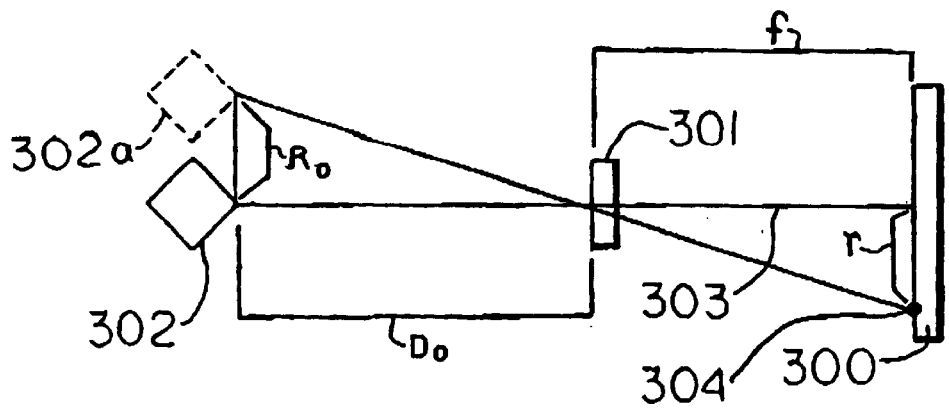
_Fig. 3_
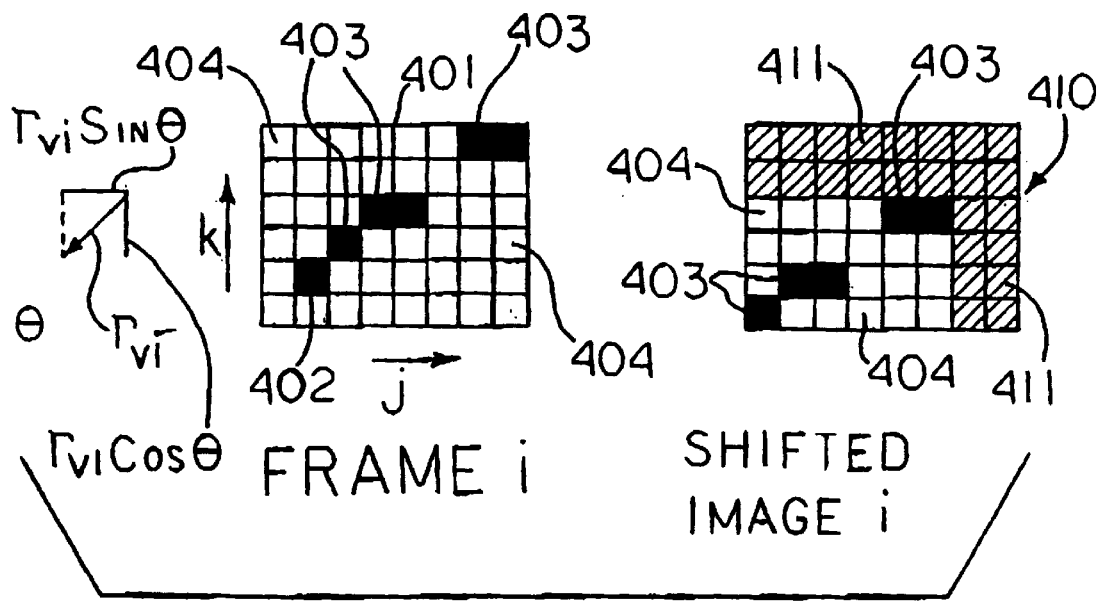
_Fig. 4_

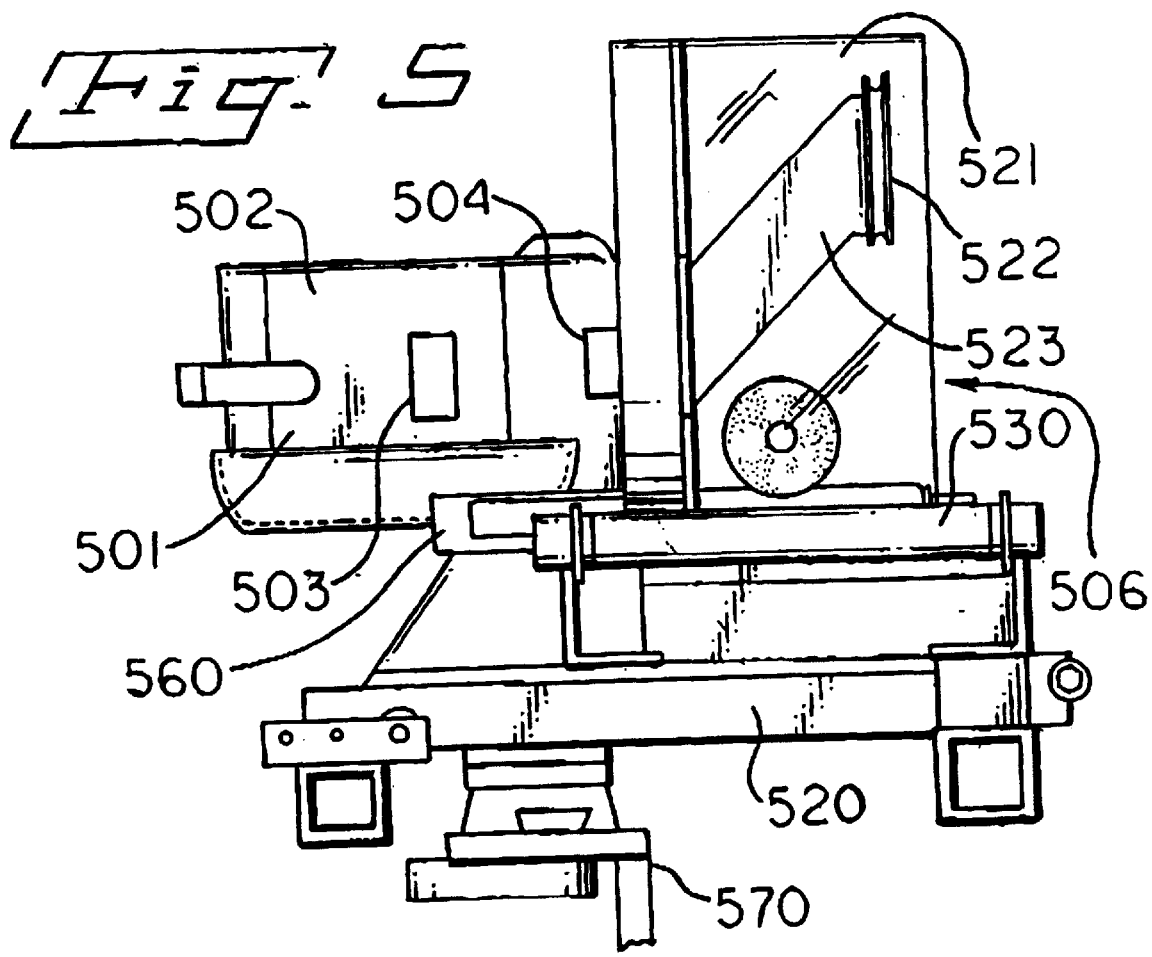

CAMERA WITH ROTATING OPTICAL DISPLACEMENT UNIT

BACKGROUND OF THE INVENTION

The present invention relates to apparatus and methods for optical image acquisition and analysis. In particular, it relates to passive techniques for measuring the ranges of objects and their locations in three dimensions.

In many surveying and related applications, it is desirable to rapidly measure the locations of all of the visible objects in a scene in three dimensions. Conventional passive image acquisition and processing techniques are effective for determining the bearings of objects, but do not adequately provide range information.

Various active techniques are used for determining the range of objects, including direct measurement, radar, sonar, scanned laser and structured light methods. Direct measurement involves holding rulers and the like up to the objects of interest or reference locations and reading the scale. This usually requires two people, and can be error-prone, time consuming and sometimes dangerous. Measurements in three dimensions can be difficult. Other active techniques involve transmitting energy to the object and monitoring the reflection of that energy. These methods have several shortcomings. They often fail when the object does not reflect the transmitted energy well or when the ambient energies are too high. Production of the transmitted energy requires special hardware that consumes power and is often expensive and failure prone. When several systems are operating in close proximity, the possibility of mutual interference exists. Scanned laser systems can be slow. Sonar is prone to errors caused by wind. Most of these active systems do not produce enough information to identify objects.

Range information can be obtained using a conventional camera, if the object or the camera is moving a known way. The motion of the image in the field of view is compared with motion expected for various ranges in order to infer the range. However, the method is useful only in limited circumstances.

Another approach is known as photogrammetry. Distinctive markers are placed within the scene, and photographs are taken from a number of angles. The locations of the markers in the resulting images are measured and triangulation is performed to infer the camera locations and, eventually, locations of objects of interest. This method is very time-consuming and tedious.

Other approaches make use of passive optical techniques. These generally break down into stereo and focus methods. Stereo methods mimic human stereoscopic vision, using images from two cameras to estimate range. Stereo methods can be very effective, but they suffer from a problem in aligning parts of images from the two cameras. In cluttered or repetitive scenes, such as those containing soil or vegetation, the problem of determining which parts of the images from the two cameras to align with each other can be intractable. Image features such as edges that are coplanar with the line segment connecting the two lenses cannot be used for stereo ranging.

Focus techniques can be divided into autofocus systems and range mapping systems. Autofocus systems are used to focus cameras at one or a few points in the field of view. They measure the degree of blur at these points and drive the lens focus mechanism until the blur is minimized. While these can be quite sophisticated, they do not produce point-by-point range mapping information that is needed in some applications.

In focus-based range mapping systems, multiple cameras or multiple settings of a single camera are used to make several images of the same scene with differing focus qualities. Sharpness is measured across the images and point-by-point comparison of the sharpness between the images is made in a way that effects of the scene contrast cancel out. The remaining differences in sharpness indicate the distance of the objects at the various points in the images.

Systems of this last type are described by Pentland, who used two or more cameras with differing apertures to obtain simultaneous images. A bulky beamsplitter/mirror apparatus is placed in front of the cameras to ensure that they have the same view of the scene. This multiple camera system is too costly, heavy, and limited in power to find widespread use. A variation is described in U.S. Pat. No. 5,365,597, where a camera system includes dual camera optics in which a beamsplitter is used within the lens system to simplify the optical design. Another improvement of Pentland's multiple camera method is described by Nourbakhsh et al. (U.S. Pat. No. 5,793,900). Nourbakhsh et al. describe a system using three cameras with different focus distance settings, rather than different apertures as in Pentland's presentation. This system allows for rapid calculation of ranges, but sacrifices range resolution in order to do so. The use of multiple sets of optics tends to make the camera system heavy and expensive. It is also difficult to synchronize the optics if overall focus, zoom, or iris need to be changed. The beamsplitters themselves must be large since they have to be sized to full aperture and field of view of the system. Moreover, the images formed in this way will not be truly identical due to manufacturing variations between the sets of optics.

An alternative method that uses only a single camera is described by Nakagawa et al. in U.S. Pat. No. 5,151,609. This approach is intended for use with a microscope. In this method, the object under consideration rests on a platform that is moved in steps toward or away from the camera. A large number of images can be obtained in this way, which increases the range-finding power relative to Pentland's method. In a related variation, the camera and the object are kept fixed and the focus setting of the lens is changed step-wise. Even in a static situation, such as a surveying application, the time to complete the measurement can be excessive. Even if the scene and the camera location and orientation are static, the acquisition of multiple images by changing the camera settings is time consuming and introduces problems of control, measurement, and recording of the camera parameters to associate with the images. Also, changing the focus setting of a lens may cause the image to shift laterally if the lens rotates during the focus change and the optical axis and the rotation axis are not in perfect alignment.

Thus, it would be desirable to provide a simplified method by which ranges and locations of objects can be determined easily and accurately. In particular, it would be desirable to provide a method by which range-mapping for substantially all objects in the field of view of a camera can be provided easily and accurately. It is further desirable to perform these measurements using relatively simple, portable equipment. It would also be desirable to produce a detailed photographic record of a scene, from which location measurements can be made as their need becomes apparent.

SUMMARY OF THE INVENTION

In one aspect, this invention is a camera system comprising
  a) a camera having a camera line of sight, an image sensor and a means for capturing images formed on the image sensor;

b) a focussing system for focussing light to form an image on the image sensor;

c) an optical displacement unit (ODU) that receives light from an offset line of sight that is different from the camera line of sight and directs the light into the camera along or parallel to the camera line of sight, the ODU being rotatable about a rotation axis that is the same as or parallel to the camera line of sight but different than the offset line of sight, wherein all elements of the focussing system, except for an optional elements for increasing field of view, are located between the ODU and the image sensor.

In a second aspect, this invention is a camera system comprising a) a camera having a camera line of sight, an image sensor and a means for capturing images formed on the image sensor;

b) a focussing system for focussing light to form an image on the image sensor; and c) an optical displacement unit (ODU) that receives light from an offset line of sight that is different from the camera line of sight and directs the light into the camera along or parallel to the camera line of sight, the ODU being rotatable about a rotation axis that is the same as or parallel to the camera line of sight but different than the offset line of sight, wherein the ODU is adapted to operate while physically detached from the camera.

In another aspect, this invention is a method for determining the range of an object, comprising a) bringing a scene containing the object within the field of view of a camera system including (1) a camera having a camera line of sight, an image sensor, a means for capturing images formed on the image sensor, (2) a focussing system for focussing light to form an image of the scene on the image sensor and (3) an optical displacement unit (ODU) that receives light from an offset line of sight that is different from the camera line of sight and directs the light into the camera along the camera line of sight, the ODU being rotatable about a rotation axis that is the same as or substantially parallel to the camera line of sight but different than the offset line of sight, so as to form an image of the scene on the image sensor;

b) capturing said image of the scene to produce a first frame;

c) rotating the optical displacement unit about the rotation axis to a different position while maintaining the orientation of the image sensor substantially constant with respect to said object, so as to effect an apparent motion of the image on the image sensor;

d) capturing another image to produce a subsequent frame;

e) determining the position of an image corresponding to at least one point on said object on the first frame and at least one subsequent frame; and f) calculating the range of the object from the positions of the image corresponding to said at least one point on said object on said first frame and at least one subsequent frame.

This aspect of the invention provides a method by which ranges of one or more objects within the field of view of the camera can be made easily and quickly. By repeating steps c)–f) for all objects in the field of view of the camera system, a range map is built that provides range information for most or all of the objects in the scene. Furthermore, steps c)–f) can be repeated one or more times, through a full rotation of the optical displacement unit if desired, to provide a larger number of frames. The range calculation in step f) can be made from position information from all (or some subset of) the frames to provide more accurate and complete range calculations.

In a third aspect, this invention is a method for determining the range of an object comprising a) bringing a scene containing the object within the field of view of a camera having (1) a camera having a camera line of sight, an image sensor and a means for capturing images formed on the image sensor, (2) a focussing system for focussing light to form an image on the image sensor and (3) an optical displacement unit (ODU) that receives light along an offset line of sight that is different from the camera line of sight and directs the light into the camera along the camera line of sight, the ODU being rotatable about a rotation axis that is the same as or substantially parallel to the camera line of sight but different than the offset line of sight, to form an image of the scene thereon, b) capturing said image of the scene to produce a first frame, c) rotating the optical displacement unit about the rotation axis to a different position while maintaining the orientation of the image sensor substantially constant with respect to said object, so as to effect an apparent motion of the image on the image sensor;

d) capturing another image to produce a subsequent frame, e) repeating steps c) and d) one or more times to produce additional subsequent frames;

f) identifying a given distance;

g) shifting each of said first and subsequent frames to produce a corresponding number of shifted images, such that objects at said given distance appear at substantially the same pixel locations in each of said shifted images;

h) summing said shifted images to form a composite image in which objects at said given distance appear to be in focus; and i) identifying pixels in said composite image having objects in focus, and assigning said given distance to objects imaged on said pixels in said composite image.

Again, the method provides an easy and accurate method of determining ranges of objects. As discussed further below, variations of this method permit increased resolution images to be formed so that improved accuracy in location estimates can be obtained. Another variation permits the dynamic range of the image to be improved, again allowing for improved accuracy of the method. Moreover, the method of the invention provides for easy and rapid determination of the transverse coordinates of an object. Together with the range determination, this permits three-dimensional mapping of any object within the field of view of the camera system.

BRIEF DESCRIPTION OF THE DRAWINGS

FIG. 3 graphically illustrates the relationship between the range of an object, the displacement of the camera line of sight, the focal length of the camera and the radius of the circle apparently transcribed by the image of the object on the image sensor.

FIG. 4 illustrates the shifting of brightness values used in one method of calculating ranges according to the invention.

FIGS. 5, 5a and 5b are side, front isometric and rear isometric views, respectively, of a second embodiment of the invention.

Figure 1:
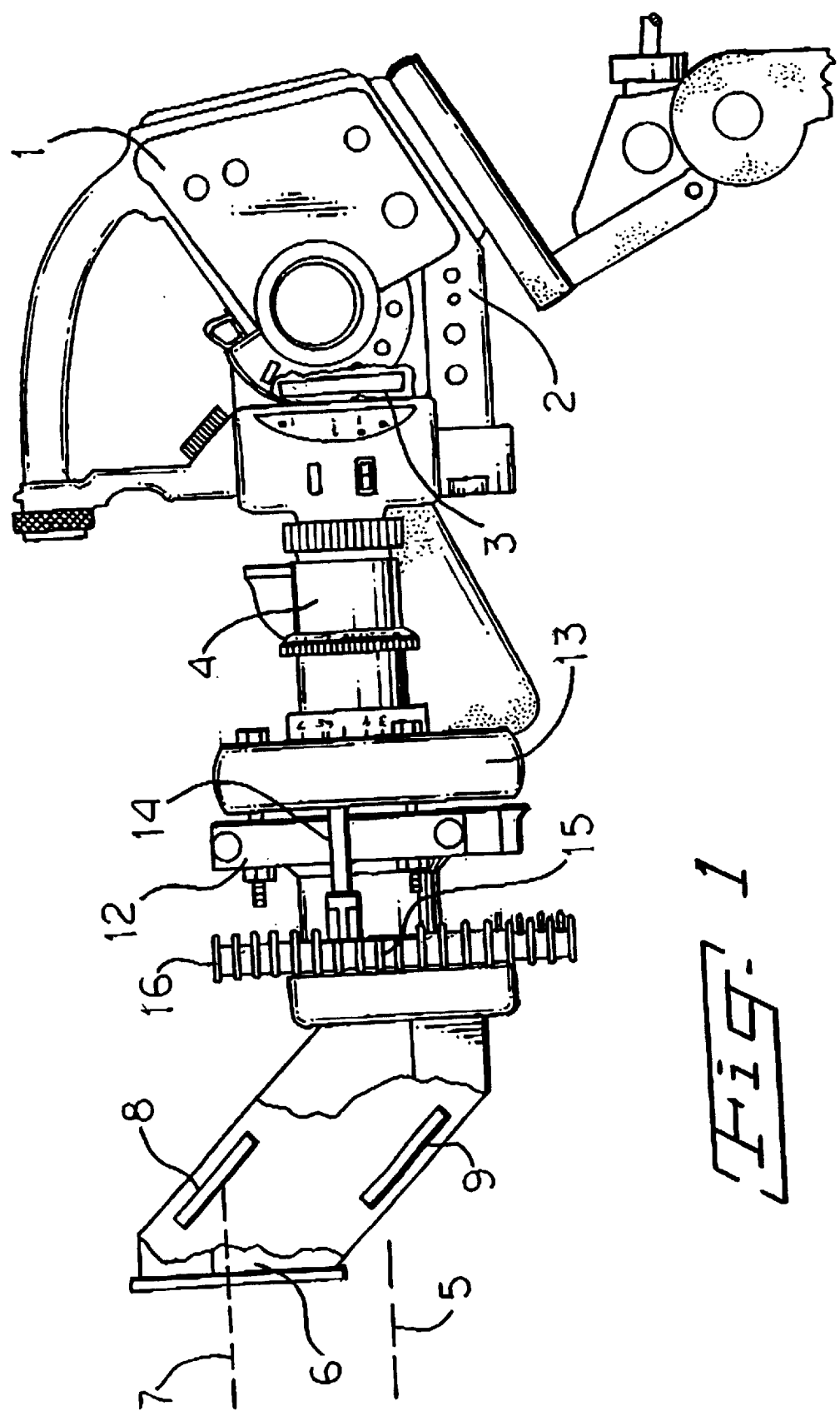
FIG. 1 is a side view, partially in section, of an embodiment of the invention.

DETAILED DESCRIPTION OF THE INVENTION,

The main components of a camera system of the invention are shown in FIG. 1. Camera 1 includes housing 2 that serves primarily to exclude unwanted light and to hold the various components in a desired spatial arrangement. Image sensor 3 is held within housing 2. Light entering ODU 6 is transmitted through lens system 4 and is focussed to form an image on image sensor 3. Camera 1 has a camera line of sight indicated in FIG. 1 by dotted line 5. ODU 6 has an offset line of sight 7. Offset line of sight 7 is substantially parallel to but not the same as camera line of sight 5. Light entering ODU 6 is displaced so that it is projected into camera 1 along camera line of sight 5. The distance between the offset line of sight and the camera line of sight is referred to herein as the offset distance.

ODU 6 is rotatable about a rotation axis. In the embodiment shown in FIG. 1, the rotation axis is the same as camera line of sight 5. This is a preferred arrangement. In a less preferred arrangement, the rotation axis is different from camera line of sight 5, but nonetheless substantially parallel to it. When the rotation axis is different than the camera line of sight, additional complexities are introduced into the algorithms for making range and location calculations.

In the embodiment shown in FIG. 1, ODU 6 is coupled to lens system 4 through coupling 12, which allows ODU 6 to rotate with respect to camera 1 without rotating lens system 4 or changing any optical settings (focus, zoom, aperture, etc.). As shown in FIG. 1, the rotation of ODU 6 can be motorized or otherwise automated. In FIG. 1, motor 13 is mounted to coupling 12. Shaft 14 rotates when motor 13 is actuated, causing gear 15 to rotate. The teeth of gear 15 mesh with those of drive gear 16 so that as gear 15 rotates, drive gear 16 rotates in the opposite direction. Drive gear 16 is coupled to ODU 6 so that ODU 6 rotates with drive gear 16. The net effect is that the ODU moves in a circular path about its rotation axis, which in FIG. 1 is the same as camera line of sight 5.

As the ODU rotates, all objects within the field of view of the camera will appear to move relative to the camera in a circle having a radius equal to the offset distance. The optics of the ODU are such that the orientation of the object relative to the image sensor does not changes during the rotation. Because the range of any object remains constant, its apparent motion will be in a plane. The line of sight of the camera is a line perpendicular to this plane that passes through the center of the entrance pupil of the camera (i.e., the passageway through which light enters the camera from the ODU). In the usual case, as shown in FIG. 1, the entrance pupil will form part of a focussing system that includes a lens. The lens preferably has an axis of symmetry. In that case the line of sight of the camera is considered to be the axis of symmetry of the lens. The offset line of sight is a line from the center of the passageway through which light enters the ODU and perpendicular to the plane formed by the apparent motion of any object within the field of view. The internal construction of the ODU is such that a light ray entering it along the offset line of sight will leave the ODU along or nearly along the camera line of sight.

The image sensor is held in a substantially constant orientation to the scene. As a result of this, the orientation of the image on the image sensor will remain the same as the ODU rotates. However, the objects will be imaged on the image sensor as moving in a curved path. The shape of the path will depend on the alignment of the offset line of sight, the camera line of sight, and the orientation of the image sensor. If the offset line of sight is parallel to the camera line of sight, and the "picture plane" (i.e. the orientation of the image sensor) is perpendicular to the incident light (both being preferred), then the curves will be circles. Variations will cause the images to move in more complex patterns. The dimensions of the curved path will depend on the object distance. As all things appear smaller if they are farther away, objects that are farther from the camera will appear, as imaged by the image sensors, to move in smaller curves.

Figure 2:
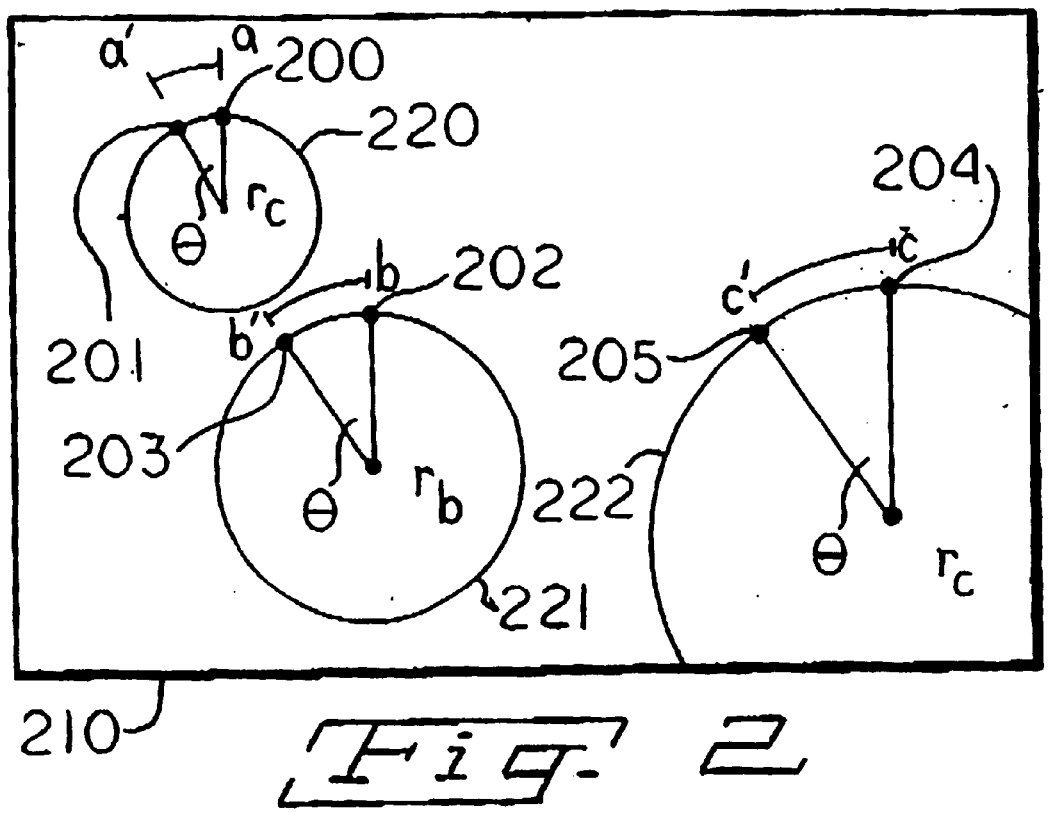
FIG. 2 illustrates the movement of an image of a point object on an image sensor as an optical displacement unit rotates in accordance with the invention.

This effect is illustrated in FIG. 2, in the preferred case where the images move in circles. In FIG. 2, three objects (A, B and C) are within the field of view of a camera according to the invention. Objects A, B and C are at different distances $D_a$, $D_b$ and $D_c$ from the camera, with $D_a > D_b > D_c$. Images corresponding to these objects at an arbitrary starting time to are indicated by points 200, 202 and 204, respectively. As the ODU rotates, the positions of the images on image sensor 210 will change. Thus, as a later time $t_1$, the images of objects A–D appear at points 201, 203 and 205, respectively. During the period $t_1$-$t_0$, the image of object A will appear to have moved along arc a–a'; that of object B along arc b–b' and that of object C along arc c–c'. As the ODU continues to move through a full rotation, the images of objects A–C will appear to transcribe circles 220, 221 and 222, respectively. Note that at any given time>$t_0$, the angle through which the images appear to have moved will be constant for all objects if the optical and offset axes are perfectly parallel. In FIG. 2, then, at time $t_1$, the images of each of objects A, B and C will have appeared to move through an angle θ. However, the distance that each image has moved will be different in each case; i.e. arc a–a'>b–b'>c–c'. The length of any given arc will be related to the radius of the circle that the image appears to transcribe by $$P=\theta r$$

where P represents the length of the arc, θ is measured in radians and r represents the radius of the circle. The radius r is related to the range of the object, as discussed more below. The change in P with changing θ is also related to r, with ΔP equaling Δθ times r. If θ is changing at a constant rate with respect to time, then dP/dt will also equal dθ/dt times r. These relationships establish that the distance of an object can be calculated from a measurement of P (if θ is known), of ΔP (if Δθ is known), of dP/dt (if dθ/dt is known), or of r. All of these values can be ascertained by determining the position of the image of a point on the object in two or more frames. The values of θ, Δθ or dθ/dt typically will be known from the position of the ODU at the time the images are made. It is also possible to measure θ, Δθ or dθ/dt directly from the images by tracking the motion of distinctive patterns on the images.

Conversely, for any given distance $D_g$, a corresponding value of r (and any of P, ΔP and dP/dt) can be calculated. Actual measured values of r, P, ΔP and dP/dt for any object in the scene can be compared with the calculated values to identify objects that are at distance $D_g$. This method is described more below.

The relationship of r to the distance of a remote object is illustrated in FIG. 3. In FIG. 3, light from object 302 passes through lens system 301 and is projected onto image sensor 300. Image sensor 300 is located at distance f from lens system 301, which is modeled abstractly here as an ideal pinhole. Object 302 is at a distance $D_o$ from lens system 301 and is located along camera line of sight 303. The ODU receives light from object 302 along an offset line of sight that is displaced from camera line of sight 303 by offset distance $R_o$. Thus, to image sensor 300, object 302 will appear as though it is located at position 302a and will be imaged on image sensor 300 at position 304. As the ODU rotates, object 302 will appear to traverse a circle having radius $R_o$. Similarly, the image of object 302 will be displaced on image sensor 300 by a distance r. Thus, the image of object 302 on image sensor 300 will appear to transcribe a circle having radius r. The distance $D_o$ is related to r, $R_o$ and f as $$D_0 = \frac{R_0 f}{r}$$

Thus, in this invention, range estimates are calculated by capturing multiple images of a scene with the ODU at different positions as each image is captured. The captured images are referred to herein as "frames". An image of a point on an object is located on the frames, and the differences between the apparent positions of the object on the various frames are used to determine r (directly or by measuring P, ΔP, dP/dt). This value of r is used to calculate the range of the object.

Although range calculations can be made in principle from as few as two successive frames (provided the angle θ does not change too much between the images), it is preferred to use frames formed over an entire rotation of the ODU. This permits better range calculations for all objects in the, scene, including objects that may be obscured by closer objects when the ODU is in certain positions. Similarly, it is preferred that the angle θ changes in constant increments between all successive frames. Changes in θ of from about 0.5° to about 10°, preferably about 1° to about 5°, especially from about 1° to about 3° of arc between successive frames are preferred. It is especially preferred to select the offset distance, the size of the pixels, the amount of rotation of the ODU between successive frames and other camera settings so that the image of any individual point in the scene will appear to move a distance equal to about 0.25 to about 10 times, more preferably about 0.5 to about 4 times, the diagonal length of the pixels.

By "capturing an image", it is meant that the image is stored in some reproducible form, by any convenient means. For example, the image may be captured on photographic film. However, making range calculations from photographic prints or slides will generally be slow and less accurate. Thus, it is preferred to capture the image as an electronic data file, especially a digital file. The data in the digital file is amenable to processing to perform automated range calculations using a computer. The preferred image sensor, then, is one that converts the image into electrical signals that can be processed into an electronic data file. It is especially preferred that the image sensor contains a regular array of light-sensing units (i.e. pixels) of known and regular size. The array is typically rectangular, with pixels being arranged in rows and columns. CCDs, CMOS devices and microbolometers are examples of the especially preferred image sensors. These especially preferred devices permit light received at a particular location on the image sensor to be identified with a particular pixel at a particular physical location on the image sensor.

CCDs are most preferred image sensors. Particularly suitable CCDs contain from about 100,000 to about 30 million pixels or more, each having a largest dimension of from about 3 to about 20, preferably about 8 to about 13 μm. A pixel spacing of from about 3–30 μm is preferred, with image sensors having a pixel spacing of 10–20 μm being more preferred. Commercially available CCDs that are useful in this invention include those of the type commonly available on consumer still and movie digital cameras. Sony's ICX252AQ CCD, which has an array of 2088×1550 pixels, a diagonal dimension of 8.93 mm and a pixel spacing of 3.45 μm; Kodak's KAF-2001CE CCD, which has an array of 1732×1172 pixels, dimensions of 22.5×15.2 mm and a pixel spacing of 13 μm; and Thomson-CSF TH7896M CCD, which has an array of 1024×1024 pixels and a pixel size of 19 μm, are examples of suitable CCDs. CCDs adapted for consumer digital video cameras are especially suitable.

CCDs and CMOSs perceive light as brightness values associated with each pixel and create an electrical signal related to these brightness values. These brightness values can be manipulated in various ways to measure P, ΔP, dP/dt or r. The brightness values can be stored into a data file and read to any convenient type of memory device. The brightness values are preferably stored as a digital file that correlates brightness values with particular pixel locations. Commercially available digital still and video cameras include microprocessors programmed with algorithms to create such digital files; such microprocessors are entirely suitable for use in this invention. Among the suitable commercially available algorithms are TIFF, JPEG, MPEG and Digital Video formats. Preferred digital files are compressed MPEG or Digital Video files, which are most preferably decompressed before calculating ranges.

A first method for calculating distances presupposes a given distance $D_g$, and evaluates the frames for objects whose image motion matches that which would be expected for an object at that distance. For the given distance $D_g$, the magnitude of r is calculated. For each of the successive frames, a direction is assigned to this magnitude to produce a radius vector $r_{vi}$, where i designates a particular frame. The direction that is assigned to each radius vector $r_{vi}$ is the direction from the offset line of sight to the camera line of sight for that frame. Thus, each of the radius vectors $r_{vi}$ will be identical in magnitude, but will be different in direction. For each frame, a shifted image is formed by taking the brightness value for each individual pixel in the frame and assigning that brightness value to another pixel that is spaced at the distance and direction specified by $r_{vi}$. As all brightness values are shifted by the same distance and in the same direction, this results in a shifted image that is the same as the original frame except it is offset by $r_{vi}$. This shifting is done for all of the frames to form a series of shifted images equal to the number of frames.

This shifting is illustrated in FIG. 4. FIG. 4 illustrates a 6×8 block of pixels 401 in which the pixels are arranged in columns j and rows k. An image formed on the pixels of block 401 is represented by a pattern of darkened pixels 402 and 403 and light pixels 404. The angle of orientation of the ODU for this particular frame is θ, and the offset distance is r. $r_{vi}$ represents the radius vector for this frame. The brightness values for any individual pixel in block 401 is to be shifted by the radius vector $r_{vi}$ to another pixel, to form a shifted image. As the pixels are arranged in rows and columns, the radius vector $r_{vi}$ is converted to its horizontal and vertical components by multiplying by −sin θ and −cos θ, respectively. As the pixels are all of a discrete size, the values of −r(sin θ) and −r(cos θ) are divided by the pixel width and length, respectively and rounded to the closest integer to identify a particular pixel to which each particular brightness value is shifted. The result is a shift of the entire image to (in this case) the left and down. The shifted image is shown in FIG. 4 on pixel block 410, which contains darkened pixels 403 and light pixels 404. Pixel block 410 represents the same position on the image sensor as pixel block 401, i.e., pixel blocks 401 and 410 each represents the same pixel locations. As can be seen, the pattern of light and darkened pixels is retained on pixel block 410. Note, however, that some of the brightness information is shifted off of the pixel block. For example, darkened pixel 402 appears on pixel block 401 but does not appear on pixel block 410 This brightness information is either shifted to adjoining pixel blocks or, if pixel block 401 is at the edge of the image sensor, simply discarded. Similarly pixel block 401 contains pixels 411 that do not contain brightness values from pixel block 401. Brightness values for these pixels comes from other pixel blocks that adjoin pixel block 410 (in this instance, at the top and/or to the right), or can contain no information if pixel block 401 is at an edge of the image sensor. In the latter case, pixels 411 are preferably assigned brightness values of zero.

An object that is actually at distance $D_g$ will all appear at or nearly at the same place in each of the shifted images. For example, if an object at distance $D_g$ is imaged at pixel (j,k) in one shifted image, it should appear at or very close to pixel (j,k) in every other shifted image. Conversely, objects that are not at distance $D_g$ will be imaged on different pixels in the different shifted images. Thus, by comparing the shifted images to see which objects appear to be in the same location all of them, objects that are at distance $D_g$ are identified. This comparison can be performed by making a composite image from the shifted images. For each pixel (j,k), the brightness values from each of the shifted images are added and averaged. This average value becomes the brightness value for pixel (j,k) in the composite image. This averaging is performed for all pixels, and the result of this is a composite image in which objects at distance $D_g$ will appear in focus. At the same time, objects at different distances will appear to be blurred in the composite image, because their images will have been shifted to different pixel locations in each of the shifted images. The nature of this blurring is that point objects will appear to blur into circles. An additional benefit is that the averaged pixels in the composite image will have a higher dynamic range than the pixels in the original frames.

The degree to which an object is in focus on the composite image can be measured in several ways. One method is applying a focus metric to the composite image. Various focus metrics are known and are useful in this context, including those described in Krotov, "Focusing", Int. J. Computer Vision 1:223–237 (1987), incorporated herein by reference, as well as in U.S. Pat. No. 5,151,609. An especially suitable focus metric is developed by calculating a Sobel value S for each pixel in the composite image, using the relationship $$S = \sqrt{\left(\frac{\partial I}{\partial j}\right)^2 + \left(\frac{\partial I}{\partial k}\right)^2}$$

$\partial I/\partial j$ and $\partial I/\partial k$ represent the partial derivatives of I with respect to pixel rows and columns, respectively. $\partial I/\partial j$ can be calculated using finite differential techniques by measuring, for frame i, the brightness intensity function for pixels (j,k), (j+1,k), (j−1,k), and if desired, other pixels in row k (such as j+2, k) and (j−2,k)). Similarly, $\partial I/\partial k$ can be determined by measuring, for frame i the brightness intensities of pixels (j,k), (j,k+1), (j,k−1), and optionally other pixels along column j. Pixels associated with high S values tend to be those in which the image is in focus. An even better focus metric performs the same operation, using the Sobel values, to provide a "second Sobel value", $S_2$, for each pixel using the relationship $$S_2 = \sqrt{\left(\frac{\partial S}{\partial j}\right)^2 + \left(\frac{\partial S}{\partial k}\right)^2}$$

where S is the Sobel value for the particular pixel, and $\partial S/\partial j$ and $\partial S/\partial k$ are the partial derivatives of S with respect to pixel rows and columns, respectively. $\partial S/\partial j$ and $\partial S/\partial k$ can be calculated using finite differential techniques as described above. For each pixel (j,k), the value of S is evaluated for a number of supposed distances, $D_g$. The distance giving the largest S, $D_g^*$, is a candidate for the distance of the portion of the object aligned with pixel (j,k). However, the circular blurring inherent in this method may create false maxima in S. As a check, $S_2$ is evaluated. At a true object distance, $S_2$ will also be a maximum.

Another method is a reverse mapping method. Each pixel location in the composite image is associated with a corresponding pixel in each of the original frames by applying a vector $-r_{vi}$. Vector $-r_{vi}$ has the same magnitude but opposite direction of the vector $r_{vi}$ that was used in generating the shifted image from that particular frame. In this manner, corresponding pixels in the frames are identified and associated with a particular pixel in the composite image. The identified pixels in the frames should, if they image an object that is in good focus, have the same or nearly the same brightness value as the pixel in the composite image. Moreover, the brightness values of these identified pixels should all be the same or nearly the same. This can be tested by comparing the brightness values for the corresponding pixels in the frames. This can be done, for example, by calculating the standard deviation in the brightness values of the identified pixels. Low variations in brightness in the corresponding pixels on the frames (i.e., a low standard deviation) indicates that the object imaged on those pixels is in good focus on the composite image, and is at or close to the distance $D_g$. By repeating this process for all pixels in the composite image, pixels in the composite image that are imaging objects close to or at distance $D_g$ can be identified. The range $D_g$ can be associated with those pixels.

This process can then be repeated for additional values of $D_g$. For each value of $D_g$, radius vectors $r_{vi}$ are calculated for each frame, shifted images are formed, and a composite image is formed from the shifted images. For any or all pixels in the composite image, a focus metric is applied or the reverse mapping method performed to identify pixels in which objects at the given distance are imaged. By repeating the process over enough values of $D_g$, ranges can be associated for each pixel in the composite image, and a range map is formed.

Note that in the foregoing discussion, the shifted images and composite images may exist only as a data file, without ever being formed onto a display. That is, the shifted images and composite image can be formed by mathematically manipulating the data files from the individual frames. The terms "shifted image" and "composite image", therefore, are used broadly herein to include such data files, where brightness values are associated with specific locations in a two-dimensional array that represents the locations of particular pixels on an image sensor. In addition, "shifted image" and "composite image" also refer to images made by displaying the data file on any suitable display, such as a cathode ray tube or liquid crystal device.

In the foregoing method, some error can be introduced as the shifted images are formed, because the values of r(sin θ)/pixel width and r(cos θ)/pixel length must be rounded to the nearest integer. This error is reduced if the number of pixels is increased (all other things being kept constant). Thus, from the standpoint of accuracy in range calculations, it is generally preferred to use an image sensor having a larger number of pixels, because this provides better resolution of the image. However, this can greatly increase cost.

Instead, the data files from the individual frames can be manipulated to improve resolution.

One method of improving resolution involves taking the data from each frame and expanding it to form an image spread over some greater number of pixels (or, as a data file, some increased number of brightness values associated with an equally increased number of specific locations in a two-dimensional array). The amount of expansion can vary considerably, to about 1.5 to about 100, preferably from about 4 to about 32 times the starting number of pixels. For example, an expansion to four times the original number of pixels can be done by making four shifted images for each frame, each time using a different rounding process, and then expanding. The rounding and expanding processes are:

Expanded shifted image i1: calculate ±r(sin θ), divide by pixel width and round to nearest integer to produce a shift of $\Delta j$ columns of pixels; calculate ±r(cos θ), divide by pixel length and round to nearest integer to produce a shift of $\Delta k$ rows of pixels. For each pixel location $(j_i,k_i)$ in the original frame, calculate a shifted position $(j_i-\Delta j, k_i-\Delta k)$, and double both $j_i-\Delta j$ and $k_i-\Delta k$ to assign a pixel location in an expanded, shifted image.

Expanded shifted image i2: calculate ±r(sin θ) as in i1 and add ½; then calculate $\Delta j$. Calculate $\Delta k$ as in i1. Calculate a shifted position and double values as before to assign a pixel location in a second expanded, shifted image.

Expanded shifted image i3: calculate $\Delta j$ as in i1 calculate ±r(cos θ) and add ½, then calculate $\Delta k$. Calculate a shifted position and double values as before to assign a pixel location in a second expanded, shifted image.

Expanded shifted image i4: calculate ±r(sin θ) as in i1 and add ½; then calculate $\Delta j$; calculate ±r(cos θ) as in k1 and add ½; then calculate $\Delta k$. Calculate a shifted position and double values as before to assign a pixel location in a second expanded, shifted image.

The resulting expanded Shifted images together include brightness values for four times the original number of pixels, in effect doubling the number of rows and columns of pixels. However, only ¼ of the pixels in each expanded, shifted image contain values. Zeros are substituted for the other pixel locations in each expanded, shifted image. The expanded, shifted images are then combined by adding them together to form a final, expanded image.

A second method of calculating ranges involves a measurement of dP/dt, assuming that successive frames are all taken so that dθ is the same between any two successive images. In this method, N frames are taken as the ODU rotates through a full circle. At any given time, the instantaneous velocity of an imaged point is a vector whose magnitude is related to r and whose direction is related to θ. As dθ is constant between frames, θ for a particular image can; be expressed in terms of the number of that image, i.e., $$\theta_i = \frac{2\pi i}{N}$$

where i represents the $i^{th}$ frame with i ranging from 0 to N, N is the total number of frames, and $\theta_i$ represents the angle for frame i in radians, with $\theta_o$ equaling 0. The instantaneous velocity of a point on the image is related to the radius r by $$r = \frac{N}{2\pi}|v|$$

where |v| is the magnitude of the instantaneous velocity of a point on the image.

|v| can be calculated from brightness information obtained from a regular array of pixels of known size and spacing. For a rectangular array of pixels, a particular pixel can be identified as pixel (j,k), where j identifies a particular column of pixels and k identifies a particular row of pixels. As the ODU rotates, any particular object will be imaged on different pixels in different frames. For any particular pixel (j,k), the brightness values seen by that pixel will change from frame to frame, if different objects become imaged upon that pixel due to the change of position of the ODU. This change in brightness values will occur most auspiciously when the edge of an object passes from one pixel to another between frames. Edges of objects are generally imaged by the image sensor as a sharp change in brightness over the range of a few pixels in any given frame. Thus, pixels that image edges of objects can be identified by looking for pixels in areas where the brightness changes rapidly as a function of pixel position. Rapid changes in brightness as a function of pixel position can be expressed in terms of ∂I/∂j and ∂I/∂k, where ∂I/∂j represents the change of brightness values along pixel column j and ∂I/∂k represents the change in brightness values along pixel row k.

For a given frame i and pixel location (j,k), |v| can be expressed in terms of this change of brightness of a particular pixel from frame to frame (∂I/∂i) and in terms of ∂I/∂j and ∂I/∂k as follows:

$$|v| = \frac{-\frac{\partial I}{\partial i}}{-(\cos\theta)\frac{\partial I}{\partial j}+(\sin\theta)\frac{\partial I}{\partial k}}$$

∂I/∂i is obtained by comparing the change in brightness intensity function of pixel j,k from frame i−1 to frame i or frame i+1. ∂I/∂j and ∂I/∂k can be calculated by using finite differential techniques as before.

For pixels that are not near the edge of an object's image, the partial derivatives ∂I/∂j and ∂I/∂k will become very small, and the calculation of |v| will become very sensitive to errors in ∂I/∂i. The algorithm can be adapted to ignore calculated values of [−cos θ(∂I/∂j)+sin θ (∂I/∂k)] that are very small. In this way range calculations are based on brightness information from pixels that reflect object edges, thereby improving the accuracy of the range calculations.

If desired, smoothing functions can be applied to the image before calculating |v|. This has the effect of making edges appear somewhat less sharp and may decrease undesired noise in the images. This, in turn, increases the number of pixels for which meaningful calculations of |v| can be made, and increases the data available for making distance calculations.

Once |v| has been measured, a value of r is calculated in straightforward fashion for each pixel and each frame, using equation $$|r| = \frac{N}{2\pi} \frac{-\frac{\partial I}{\partial i}}{-(\cos\theta)\frac{\partial I}{\partial j} + (\sin\theta)\frac{\partial I}{\partial k}}$$

Then, a "corrected" image is made for each frame by shifting the brightness function of each pixel by the value of r calculated for that pixel and that frame. Thus, the brightness intensity function of pixel j,k of frame i is associated with a new pixel in the corrected image that is a distance of r from pixel j,k. The new pixel will be at $j_{corr}, k_{corr}$, where $$j_{corr} = [j - r \sin\theta]$$

and $$k_{corr} = [k - r \cos\theta],$$

both being rounded to the nearest integer. The value of D, the distance of the imaged object, is calculated in each instance.

The process of calculating |v|, D, $j_{corr}$ and $k_{corr}$ is repeated for each pixel and each frame. The result is that a certain number $M(j_{corr}, k_{corr})$ of corrections m will have been made to any particular pixel $j_{corr}, k_{corr}$, and each of those corrections will have a value of $D_{corr}, k_{corr}$) associated with it. A histogram of the distances associated with corrections to pixel $j_{corr}, k_{corr}$, will indicate the distance(s) of one or more objects that are along the bearing corresponding to pixel $j_{corr}, k_{corr}$. Thus, in the corrected image, a number of pixels at specific locations will have one or more distances associated with them. These distances and the locations of the corresponding pixels in the corrected image form a range map of objects in the field of view of the camera.

As this second method relies heavily on the identification of object edges to provide data for range calculations, the product range map tends to provide range calculations mainly for the outlines of objects.

A third method of calculating ranges involves identifying, in a first frame, a contiguous group of pixels upon which an object or portion of an object is imaged. The size of the pixel group may vary, but a square or rectangular pattern of up to about 100 pixels is particularly useful for this purpose. The brightness values of the second frame are analyzed to identify a pixel group of like size that contains the same image. This can be done in several ways, but in principle this is done by attempting to match the pattern of brightness values of the identified group of pixels from the first frame to some group of pixels in the second frame. Various statistical methods can be used to define the best match. The search for the pixel group in the second frame that is the best match is simplified if the angle θ is small between the frames, so that the image moves a distance of no more than about 10 times the pixel diagonal length between frames. Once the matching pixel group in the second frame is identified, the matching process is preferably repeated over additional frames, most preferably over a group of frames that are taken as the ODU moves over an entire circle. The relative positions of the pixel groups identified in this way are used to calculate P, ΔP, dP/dt or r. A good way to accomplish this is to fit the positions of the pixels groups to a circle, using any convenient algorithm that will perform the fitting function. The radius r is then calculated from the circle that provides the best fit to the data. An example of an algorithm for accomplishing this is: Given (j(i),k(i)) for i=1, . . . , N, find the center ($j_o, k_o$), the radius r and a quality measure $\sigma^2$.

Step 1:

$$j_o \leftarrow \frac{1}{N}\sum_{i=1}^{N} j(i)$$

$$k_o \leftarrow \frac{1}{N}\sum_{i=1}^{N} k(i)$$

$$r \leftarrow \frac{1}{N}\sum_{i=1}^{N} \sqrt{(j(i) - j_o)^2 + (k(i) - k_o)^2}$$

Step 2: for i=1 to N, let $$\delta_j(i) \leftarrow (j(i) - j_o)\left(1 - \frac{r}{\sqrt{(j(i) - j_o)^2 + (k(i) - k_o)^2}}\right)$$

$$\delta_k(i) \leftarrow (k(i) - k_o)\left(1 - \frac{r}{\sqrt{(j(i) - j_o)^2 + (k(i) - k_o)^2}}\right)$$

Step 3:

$$j_o \leftarrow j_o + \frac{1}{N}\sum_{i=1}^{N} \delta_j(i)$$

$$k_o \leftarrow k_o + \frac{1}{N}\sum_{i=1}^{N} \delta_k(i)$$

$$r \leftarrow \frac{1}{N}\sum_{i=1}^{N} \sqrt{(j(i) - j_o)^2 + (k(i) - k_o)^2}$$

Step 4: repeat steps 2 and 3 about 3–10 times. $j_o$, $k_o$ and r will converge rapidly to the optimum values.

Step 5:

$$\sigma^2 \leftarrow \frac{1}{N}\sum_{i=1}^{N} [\delta_j^2(i) + \delta_k^2(i)]$$

Accept the result if $\sigma^2 < 1$.

Many variations of the camera, ODU and the method of the invention are possible. For instance, in the embodiment shown in FIG. 1, the movement of the ODU is motorized. However, this is optional, and the ODU may be rotated manually between frames. The ODU may be designed so that it can be rotated in fixed angular increments, so that it can be rotated through a fixed arc after each frame.

If the ODU is motorized, its rotation may be synchronized with the camera so that the ODU rotates at a speed that is matched with the rate that individual frames are created, so that Δθ (i.e., the change in angle between frames) is a desired value.

Figure 5A:
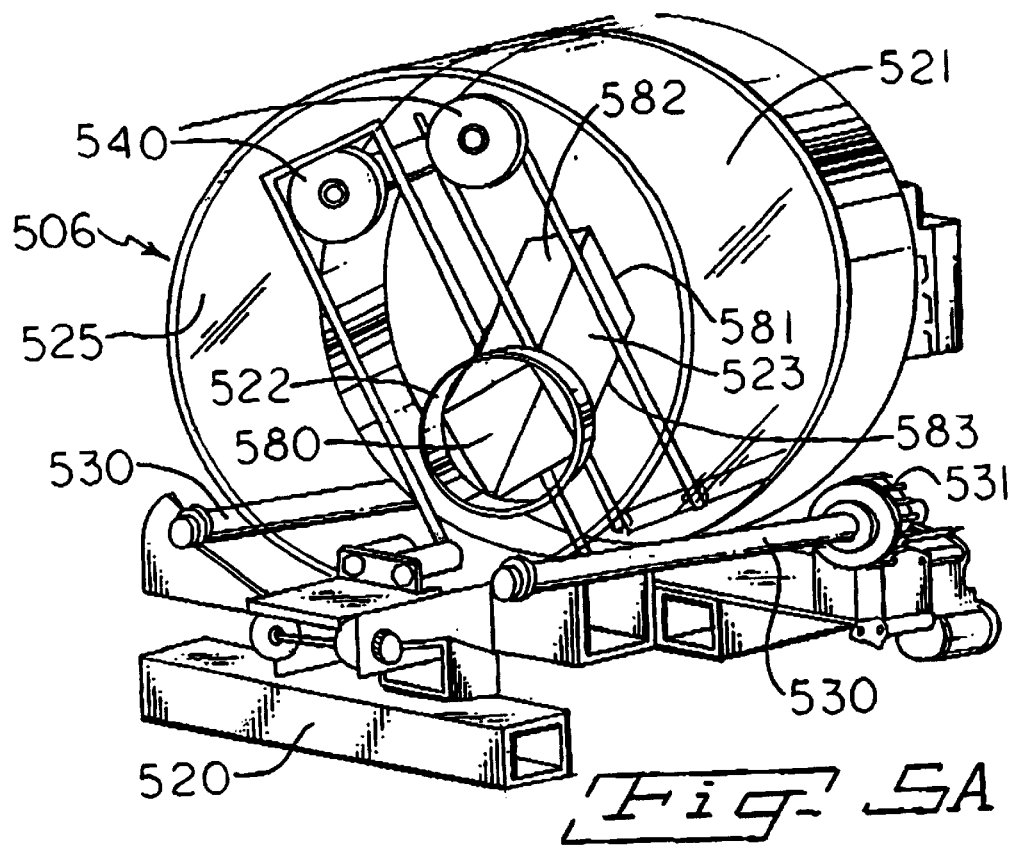
Figure 5B:
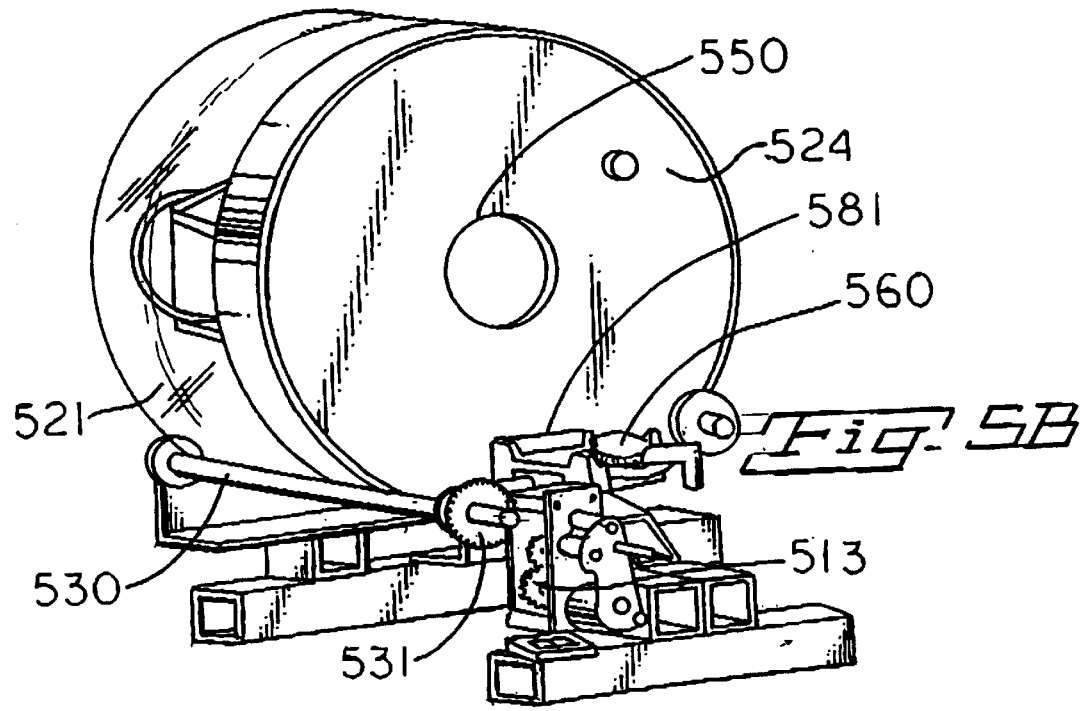

Another variation from the embodiment shown in FIG. 1 involves the location of the lens system. As shown in FIG. 1, lens system 4 is located between ODU 6 and image sensor 3, so that light first passes through ODU 6, then through lens system 4 and on to image sensor 3. However, the relative locations of lens system 4 and ODU 6 can be reversed if desired, so that light first passes through the lens system, then through the ODU and on to the image sensor. In practice, it is sometimes preferred to use elements of the lens systems on either side of the ODU, as is shown in FIG. 5 and 5a. In FIGS. 5 and 5a, wide angle lens 580 is provided on the distal end of ODU 506, and a proximal focussing lens system 504 is furnished between ODU 506 and image sensor 503. It is generally preferred that all elements of the focussing system are located between the ODU and the image sensor, with the exception of elements such as a negative lens that are used to increase field of view. Elements for increasing field of view may be used at the distal end of the ODU, as shown in FIGS. 5, 5a and 5b.

In another significant variation, the ODU is physically separate from the camera as the camera system is operated. An embodiment reflecting this variation is shown in FIGS. 5, 5a and 5b. In FIG. 5, camera 501 rests on camera mount 560, which is attached to frame 520. Camera mount 560 is designed and placed so that light can enter camera 501 along the camera line of sight through opening 550. Rotatably mounted onto frame 520 are rollers 530. Drum 521 rests on rollers 530. Mounted inside of drum 521 is prism assembly 523. Drum 521 includes a back panel 524 having opening 550. Opening 550 is centered about the line of sight of camera 501. As shown, drum 521 also includes a front panel 525 onto which is mounted optional wide angle lens 522. Optional wide angle lens 522 is mounted on front panel 525 in front of prism assembly 523. Also mounted on frame 520 is motor 513 which, when activated drives a series of gears. Gear 531 is mounted on one of rollers 530, and engages one of the series of gears that is driven by motor 513. When motor 513 is operated, drum 520 rotates about the rotation axis, which as shown is the same as the camera line of sight of camera 501. In the embodiment shown, counterweights 540 balance the weight of prism assembly 523 to ensure smoother movement.

The pathway for light to enter camera 501 is through wide angle lens 522 and prism assembly 523, and out through back panel 524 through opening 550. Prism assembly 523 is designed such that a light ray entering it along the offset line of sight is reflected so that it enters camera 501 along the camera line of sight. As drum 520 is rotated, the offset line of sight rotates in a circle around the rotation axis and camera line of sight of camera 501.

As before, motor 513 is optional, as drum 520 can be rotated manually if desired. Other variations already discussed apply to the embodiment shown in FIGS. 5, 5a and 5b, as well For example, the rotation of drum 520 can be synchronized with the camera so a desired rotation occurs between successive frames; the lens system may be on either side of the ODU, and the like.

In general, the form of the ODU is not critical, as long as it receives light along an offset line of sight that is different than the camera line of sight, and reflects the light to produce a beam that enters the camera along the camera line of sight. A simple form of ODU is illustrated in FIG. 1. ODU 6 has reflective surfaces 8 and 9 that are substantially parallel to each other, and at an angle to the optical line of sight of the camera. Reflective surfaces 8 and 9 can be, for example, a polished metal or an optical glass or other surface that contains a reflective coating. Suitable reflective coatings include metallic, dielectric and hybrid metallic/dielectric coatings. It is within the scope of the invention to include relay lenses within the ODU, similar to those that are commonly used within periscopes, to, increase the field of view while providing a large offset distance. Uncoated prisms can also be used, since the mirror function can be provided by total internal reflections. As second form of ODU is shown in FIGS. 5, 5a and 5b, and consists of a prism assembly. A suitable prism assembly has two parallel reflecting surfaces, shown in FIG. 5a at 582 and 583, which take light entering the assembly (through face 580 in FIG. 5a) and reflect it internally (i.e., through the prism) to redirect it as described before. A simple example of a suitable prism assembly consists of two right triangular prisms that are cemented together to form a rhombus. The reflective surfaces correspond to faces along the hypotenuses of the right triangular prisms. Bent optical fibers that are highly polished at both ends can also serve to receive incoming light along the offset line of sight and direct it along the camera line of sight to the image sensor.

The magnitude of the offset distance is not especially critical, provided that sufficient apparent motion of the image is created to perform measurements for range calculation. In general, increasing the offset distance will increase the apparent motion of the image on the image sensor. A suitable offset distance for many applications is from about 1 inch to about 3 feet, preferably from about 2–18 inches, more preferably from about 2–12 inches, especially from about 4–8 inches.

Although it is preferred that the offset line of sight, the camera line of sight and the direction of a ray that leaves the ODU after entering it along the offset line of sight all be parallel, small variations from parallel can be tolerated. Preferably, any variation from parallel is less than 1° of arc, and is more preferably less than about 20 minutes of arc. These small variations can be accounted for through modifications in the processing algorithms. These variations will cause small changes in the paths of the images on the image sensor, which will depend on the distance of particular objects. These variations may also cause the angle θ to vary with the distance in a predictable way. This variation can also be used of range determination and for calculating the focal length of the lens system (which can be of significant value if the focal length is adjustable, as with a zoom lens).

The ODU can be rotated in several ways. In the embodiment shown in FIG. 1, ODU 6 is mounted onto camera housing 2 in such a way that it can be rotated. In such an embodiment, ODU rotation may be manual or motorized. For manual rotation, an ODU mounting that permits it to be rotated in pre-set angular increments is preferred.

The ODU can be rotated continuously, or it can be rotated in increments between frames and held in a stationary position while each frame is captured. If the ODU is rotated continuously, the rotation rate and "shutter speed" (i.e., time required to capture an image) should be selected together to minimize blurring.

If the camera is a still camera, a motorized ODU can be synchronized or tied into a frame advance unit in the camera, if desired. When a still camera is used, a motor operating the ODU can also be actuated in concert with the shutter of the camera, so the ODU advances automatically over a predetermined angle of rotation when the shutter is activated.

The camera system will include a focussing system and an image sensor. The focussing system is any device that can focus light from a remote object being viewed onto the image sensor. Thus, focusing system 2 can be a single lens, a compound lens system, a mirror lens (such as a Schmidt-Cassegrain mirror lens), or any other suitable method of focussing the incoming light as desired. If desired, a zoom lens, telephoto or wide angle lens can be used. Similarly, it is preferred to use a compound lens that corrects for aberration caused by the individual lenses or the ODU. Techniques for designing focusing system, including compound lenses, are well known and described, for example, in Smith, "Modern Lens Design", McGraw-Hill, New York (1992). In addition, lens design software programs can be used to design the focussing system, such as OSLO Light (Optics Software for Layout and Optimization), Version 5, Revision 5.4, available from Sinclair Optics, Inc.

The focusing system may include an adjustable aperture. However, it is preferred to use a small aperture in order to increase sharpness and maintain a large depth of field. Having a large depth of field helps to keep objects at significantly different distances in focus, which permits range calculations to be made for all of the objects simultaneously. An aperture setting corresponding to an f-number of about 5.6 or more, preferably 7 or is especially suitable. However, it is within the scope of the invention to survey a scene multiple times with different focus settings, in order to make separate measurements for objects that are near the camera and those which are farther away. In this case, it may be desired to use a wider aperture and a smaller depth of field.

The camera will also contain a means for capturing an image to make a frame. For still cameras, this typically will include film or, preferably, a memory means (such as an electromagnetic memory card, analog or digital video tape and the like) for storing brightness values in conjunction with particular pixel locations, as well as a shutter mechanism of some type. All of these components are entirely conventional.

In addition to the components described above, the camera will also include a housing to exclude unwanted light and hold the components in the desired spatial arrangement. The optics of the camera may include various optional features, such as a zoom lens; an adjustable aperture; an adjustable focus; filters of various types, connections to power supply, light meters, various displays, and the like, as well as various operating controls.

It is not generally required to specially adapt a camera for use with this invention. Commercially available still and video cameras that are sold into consumer and professional applications are entirely suitable. Digital cameras, both still and video, are preferred. Video cameras are more preferred, and video cameras that capture images in MPEG format are especially preferred. The MPEG format stores image data in a form that is easily manipulated to perform the range calculations discussed before. In addition, commercially available video cameras capture frames at a relatively fast rate (about 18–50 frames/second) so that the ODU can be rotated continuously without causing the camera to fall behind. This permits the simplest and fastest operation of the camera system and method of the invention.

As it is important to know the orientation of the ODU in each frame, the camera system or method of the invention preferably includes some means or step for associating the orientation of the ODU with each frame. This can be accomplished in several ways. One method is to incorporate a cross-hair or other visual position indicator into the ODU, so that the cross-hair or other indicator will appear on the captured image. Another convenient method is simply to capture the first frame while the ODU is at a known first position, and then move the ODU through constant angles between all subsequent frames. This can be done using a video camera by rotating the ODU at a constant speed while capturing frames at constant intervals. Various methods can be used to estimate the angle by inspecting the images. For example, the pattern-matching algorithm discussed previously can be used to determine the angle.

Frame processing is preferably done using a computer, using electronic data files that are most preferably digital files. The computer is programmed to read the electronic data file and to perform the necessary algorithms to calculate ranges. Applications programs for processing digital images are commercially available and can be used to perform the processing described herein to do range calculations. One such freely available program for processing digital images is NIH Image version 1.6.2 from the National Institutes of Health. This software product includes subroutines for performing image shifting, and macros can be programmed within this software to perform the remainder of the range calculations. Version 1.6.2 is in a Macintosh format, but a Microsoft Windows version is available from Scion Corporation and a Java version, Image J, is also available from the National Institutes of Health.

The method of the invention is suitable for a wide range of applications. In a simple application, the range information can be used to create displays of various forms, in which the range information is converted to visual or audible form. Examples of such displays include, for example:

(a) a visual display of the scene, on which superimposed numerals represent the range of one or more objects in the scene;

(b) a visual display that is color-coded to represent objects of varying distance;

(c) a display that can be actuated, such as, for example, operation of a mouse or keyboard, to display a range value on command;

(d) a synthesized voice indicating the range of one or more objects;

(e) a visual or aural alarm that is created when an object is within a predetermined range, and (f) a display upon which the composite image for a given distance can be called and viewed to find things that are in focus. A focus metric can be used to highlight parts of any composite image to identify the objects that are best in focus. A user interface allows the user to specify portions of the composite image that are of interest, and the distance coordinates are displayed and/or stored in a computer file in a format suitable for importing into a spreadsheet.

The range information can be combined with angle information derived from the pixel indices to produce three-dimensional coordinates of selected parts of objects in the images. The three-dimensional coordinates can be converted into a file format suitable for 3D computer-aided design (CAD). Such formats include the "Initial Graphics Exchange Specifications" (IGES) and "Drawing Exchange" (DXF) formats. The information can then be exploited for many, purposes using commercially available computer hardware and software. For example, it can be used to construct 3D models for virtual reality games and training simulators. It can be used to create graphic animations for, e.g., entertainment, commercials, and expert testimony in legal proceedings. It can be used to establish as-built dimensions of buildings and other structures such as oil refineries. It can be used as topographic information for designing civil engineering projects. A wide range of surveying needs can be served in this manner.

The camera system of the invention can also be used to determine the location of objects in three dimensions. Range is determined as described above. The remaining two dimensions are determined from the center of the circle of motion of the image of a particular object on the image sensor. This center point is related to physical coordinates x and y according to $$x = \frac{D}{f} j_o dx$$

$$y = \frac{D}{f} k_o dx$$

where f is the focal length, D is the range of the object, $j_o$ and $k_o$ together designate the pixel at the center of motion of the object, $j_c$ and $k_c$ designate the location of the pixel at the center of the image, and dx and dy designate the pixel spacing. If the camera has a zoom lens, the focal length may not be known and the determination of x and y ordinarily is complicated. This can be solved according to the invention because the offset distance $R_o$ provides an absolute reference for measuring these dimensions. x and y are related to $R_o$ as follows:

$$x = \frac{R_o}{r}(j_o - j_c)dx$$

$$y = \frac{R_o}{r}(j_o - j_c)dy$$

Thus, transverse distances x and y can be measured according to the invention without knowing either the range or focal length.

Alternatively, transverse coordinates can be obtained by making images as described herein from different camera positions. Multiple determinations of the transverse coordinates establish the three-dimensional locations of selected points, even without knowing the focal length. This method is more robust than photogrammetry because it is not sensitive to errors in determining the focal length or the range. Also, no markers need be inserted into the scene.

In addition, the camera system of the invention is useful to provide transverse measurements of objects that are approximately perpendicular to the camera line of sight.

It will be appreciated that many modifications can be made to the invention as described herein without departing from the spirit of the invention, the scope of which is defined by the appended claims.

What is claimed is:

1. A camera system comprising
   a) a camera having a camera line of sight, an image sensor and a means for capturing images formed on the image sensor;
   b) a focussing system for focussing light to form an image on the image sensor;
   c) an optical displacement unit (ODU) that receives light from an offset line of sight that is different from the camera line of sight and directs the light into the camera along or parallel to the camera line of sight, the ODU being rotatable about a rotation axis that is the same as or parallel to the camera line of sight but different than the offset line of sight, wherein all elements of the focussing system, except for optional elements for increasing field of view, are located between the ODU and the image sensor, and wherein the ODU is not attached to the camera.

2. A method for determining the range of an object, comprising
   a) bringing a scene containing the object within the field of view of a camera system including (1) a camera having a camera line of sight, an image sensor, a means for capturing images formed on the image sensor, (2) a focussing system for focussing light to form an image of the scene on the image sensor and (3) an optical displacement unit (ODU) that receives light from an offset line of sight that is different from the camera line of sight and directs the light into the camera along the camera line of sight, the ODU being rotatable about a rotation axis that is the same as or substantially parallel to the camera line of sight but different than the offset line of sight, so as to form an image of the scene on the image sensor;
   b) capturing said image of the scene to produce a first frame;
   c) rotating the optical displacement unit about the rotation axis to a different position while maintaining the orientation of the image sensor substantially constant with respect to said object, so as to effect an apparent motion of the image on the image sensor;
   d) capturing another image to produce a subsequent frame;
   e) determining the position of an image corresponding to at least one point on said object on the first frame and at least one subsequent frame; and
   f) calculating the range of the object from the positions of the image corresponding to said at least one point on said object on said first frame and at least one subsequent frame.

3. The method of claim 2, wherein the offset line of sight is parallel to the camera line of sight.

4. The method of claim 3 wherein the rotation axis is the same as the camera line of sight.

5. The method of claim 4 wherein the image sensor is a CCD.

6. The method of claim 4 wherein the ODU rotates through a constant angle between each frame, images move in circles on the image sensor as the ODU rotates, and ranges are calculated by determining the instantaneous velocity of an imaged point.

7. The method of claim 2 wherein ranges are calculated by defining a given distance $D_g$ and evaluating the frames for objects whose motion matches that expected for an object at distance $D_g$.

8. The method of claim 7 wherein the frames are evaluated by forming a shifted image corresponding to each frame by applying to each frame a radius vector $r_{vi}$ having a magnitude corresponding to the radius of a circle the corresponds to the expected movement on the image sensor of an image of an object at distance $D_g$, and a direction for each frame corresponding to the direction from the offset line of sight to the camera line of sight, forming a composite image from the shifted images, identifying pixels in the composite image in which objects are in focus, and assigning a distance of $D_g$ to objects imaged on the identified pixels.

9. The method of claim 8 wherein pixels in the composite image in which objects are in focus are identified by applying a focus metric.

10. The method of claim 8 wherein pixels in the composite image in which objects are in focus are identified in a reverse mapping method in which each pixel in the composite image is associated with a pixel in each of the frames by applying a vector $-r_{vi}$, and the brightness values of the associated pixels in the frames are compared.

11. The method of claim 2 wherein transverse coordinates of said object are also calculated to determine a three-dimensional map of the object.

12. The method of claim 2, wherein steps steps c) and d) are repeated one or more times to produce additional subsequent frames and wherein step f) is performed by
   g) identifying a given distance;
   h) shifting each of said first and subsequent frames to produce a corresponding number of shifted images, such that objects at said given distance appear at substantially the same pixel locations in each of said shifted images;
   i) summing said shifted images to form a composite image in which objects at said given distance appear to be in focus; and j) identifying pixels in said composite image having objects in focus, and assigning said given distance to objects imaged on said pixels in said composite image.

13. A camera system comprising a) a camera having a camera line of sight, an image sensor and a means for capturing images formed on the image sensor;

b) a focussing system for focussing light to form an image on the image sensor; and c) an optical displacement unit (ODU) that (1) is physically detached from the camera and (2) receives light from an offset line of eight that is different from the camera line of sight and directs the light into the camera along or parallel to the camera line of sight, the ODU being rotatable about a rotation axis that is the same as or parallel to the camera line of sight but different than the offset line of sight.

14. A method for determining the range of an object, comprising a) bringing a scene containing the object within the field of view of a camera system of claim 13, so as to form an image of the scene on the image sensor;

b) capturing said image of the scene to produce a first frame;

c) rotating the optical displacement unit about the rotation axis to a different position while maintaining the orientation of the image sensor substantially constant with respect to said object, so as to effect an apparent motion of the image on the image sensor;

d) capturing another image to produce a subsequent frame;

e) determining the position of an image corresponding to at least one point on said object on the first frame and at least one subsequent frame; and f) calculating the range of the object from the positions of the image corresponding to said at least one point on said object on said first frame and at least one subsequent frame.

15. A method for determining the range of an object, comprising a) bringing a scene containing the object within the field of view of a camera system including (1) a camera having a camera line of sight, an image sensor, a means for capturing images formed on the image sensor, (2) a focussing system for focussing light to form an image of the scene on the image sensor and (3) an optical displacement unit (ODU) that receives light from an offset line of sight that is different from the camera line of sight and directs the light into the camera along the camera line of sight, so as to form an image of the scene on the image sensor;

b) capturing said image of the scene to produce a first frame;

c) rotating the optical displacement unit about a rotation axis that is the same as or parallel to the camera line of sight so as to effect an apparent motion of the object in a plane;

d) capturing another image to produce a subsequent frame;

e) determining the position of an image corresponding to at least one point on said object on the first frame and at least one subsequent frame; and f) calculating the range of the object from the positions of the image corresponding to said at least one point on said object on said first frame and at least one subsequent frame.

* * * * *